UNITED STATES PATENT OFFICE.

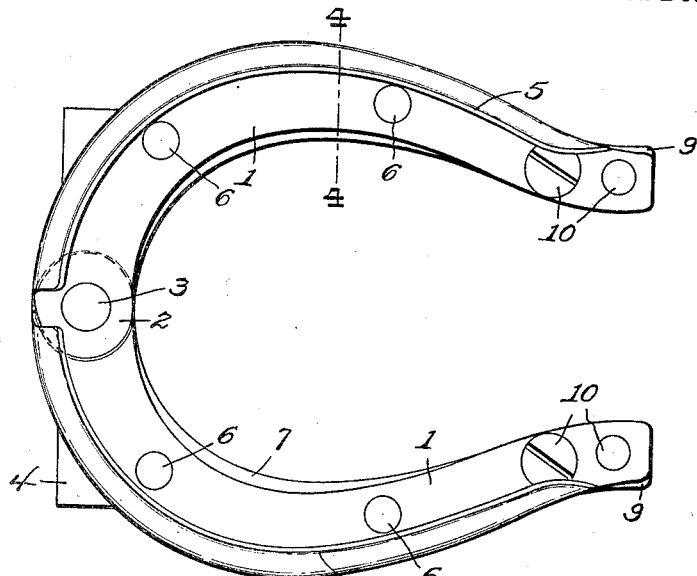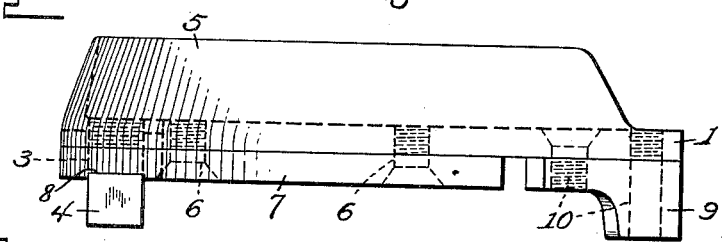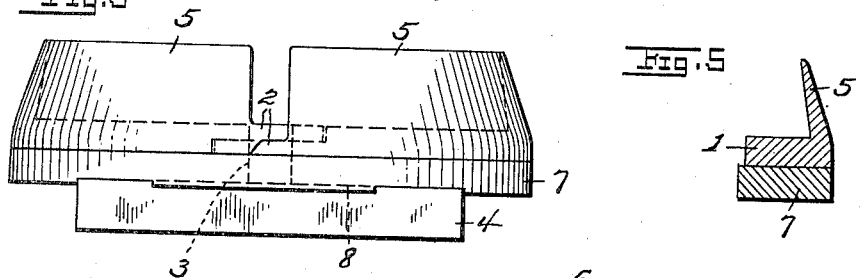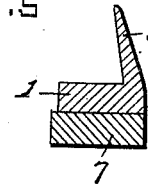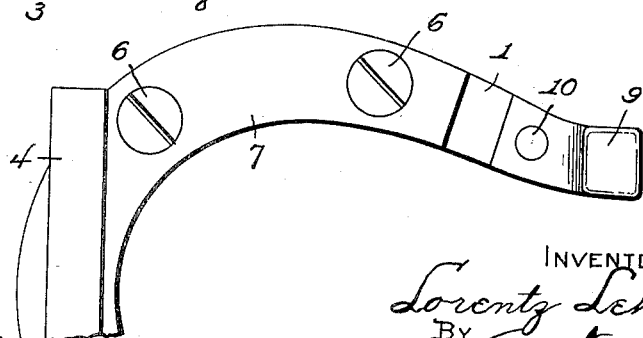

LORENTZ LEHOTZKÝ, OF BRIDGEPORT, OHIO, ASSIGNOR OF ONE-THIRD TO FRANK KRONJAEGER, OF WHEELING, WEST VIRGINIA.

HORSESHOE.

1,082,276.  Specification of Letters Patent.  Patented Dec. 23, 1913.

Application filed September 3, 1913. Serial No. 787,851.

*To all whom it may concern:*

Be it known that I, LORENTZ LEHOTZKÝ, a citizen of the United States of America, and resident of Bridgeport, county of Belmont, and State of Ohio, have invented certain new and useful Improvements in Horseshoes, of which the following is a specification.

This invention relates broadly to horseshoes, and specifically to that type of horseshoe which is attached to a horse's hoofs without the use of nails.

The primary object of the invention is to provide a simple and practical form of horseshoe adapted for attachment without the employment of nails, having those portions thereof which are subject to greatest wear readily detachable and renewable.

A further object is to provide a horseshoe of the character mentioned, the body of which is composed of jointed sections adapted to be adjusted more or less with respect to each other to fit a horse's hoof and which, when so adjusted on the hoof, is rigidly clamped in position.

With these and other objects in view, the invention resides in the features of construction, arrangement of parts and combinations of elements which will hereinafter be fully described, reference being had to the accompanying drawings, forming a part of this specification, in which—

Figure 1 is a top plan view of the invention; Fig. 2 is a side elevation of the same; Fig. 3 is a front elevation of the same; Fig. 4 is a bottom plan view of a broken portion of the same; and Fig. 5 is a cross section on the line 4—4, Fig. 1.

Referring to said drawings, in which like designating characters distinguish like parts throughout the several views—1 1 are two similar shoe sections each of which is reduced at its front end to form portions 2 adapted to assume overlapping relation. Said sections are of such form that when connected together at their front ends, a shoe of the ordinary shape is constituted. Said sections are connected at their front ends by means of a pivot-pin 3 which may either be directed inward through a toe calk 4 or formed integral with said calk. The manner of directing said pivot-pin into place will hereinafter be described. Formed integral with each of said sections 1 and extending substantially from one end of the section to the other is an upwardly and inwardly directed flange 5 adapted to assume binding engagement with a horse's hoof resting upon the top face of the section, whereby, when said sections are adjusted, the same are firmly clamped upon the hoof.

Attached to the under faces of the two shoe sections 1, as by means of upwardly directed screw-bolts 6, so as to underlie the toe portions and adjacent portions of the bodies of said sections and so as to maintain the latter rigidly in adjusted relation to each other, is a member 7 of substantially horseshoe shape which also serves to take most of the wear of road travel. Extending transversely across the foremost part of the under face of said member 7 is a shallow groove 8 adapted for receiving therein the toe-calk 4 hereinbefore referred to, whereby, when seated therein, said calk is effectually maintained against rotary movement with respect to said member. Formed integral with said toe-calk is the pivot-pin 3 which is passed through said member 7 and has its end threaded through corresponding holes provided in the overlapping ends of the shoe sections.

Detachable heel-calks 9 are preferably provided, the same being rigidly attached to the rear ends of the shoe-sections in any appropriate manner, as by means of screw-bolts 10.

In practice, the member 7 is first shaped to conform to the size and form of the hoof to be fitted. The toe-calk 4 is then mounted in the receiving groove 8 with the pivot pin 3 projecting through the hole provided therefor in said member 7, and the point of said pivot pin is then directed into the threaded holes provided therefor in the overlapping ends of the sections 1, the member 7 and said toe-calk being turned together to effect the seating of said pin and at the same time maintain the calk in the groove 8. Then, the sections 1 are swung toward or away from each other as required to conform to said member and bring the bolt holes therein into alinement with those provided in said member, whereupon the bolts 6 are inserted in place to maintain the parts in fixed relation.

From the foregoing it will be noted that I provide a simple and efficient shoe which is attached without nails and in which parts subjected to wear may be readily replaced.

Having thus described my invention, what I claim as new, and desire to secure by Letters Patent, is—

1. A horseshoe comprising two shoe-sections pivotally connected at their front ends, each section having an upwardly and inwardly directed flange adapted to assume clamping engagement with the hoof, a curved member underlying the front ends of said sections and having a transverse groove in its under face, a toe-calk seated in said groove and carrying a pin which projects through said member and constitutes the pivotal connection for said sections, and means rigidly securing said member to said sections.

2. A horseshoe comprising two complemental shoe sections having overlapping portions at their front ends and having flanges adapted to assume clamping engagement with a hoof, a curved member underlying the front ends of said sections and having a seat for a toe-calk provided in the under face thereof, a toe-calk in said seat, a pin formed integral with said calk and directed through said member into pivotal connecting engagement with said shoe sections, and means rigidly connecting said member to said sections.

3. A horseshoe comprising two complemental shoe sections having overlapping portions at their front ends and having flanges adapted to assume clamping engagement with a hoof, a curved member underlying the front ends of said sections and having a seat for a toe-calk provided in the under face thereof, a toe-calk in said seat, a pin directed upward through said member into seating engagement with the uppermost of the overlapping portions of said sections and connecting said toe-calk to said sections, said pin also constituting a pivotal connection for said sections, and means detachably connecting said member to both of said sections whereby the latter are maintained in fixed relation.

4. A horseshoe comprising two complemental shoe sections having overlapping portions at their front ends and having flanges adapted to assume clamping engagement with a hoof, a curved member underlying the front ends of said sections and having a seat for a toe-calk provided in the under face thereof, a toe-calk in said seat, a pin directed upward through said member into seating engagement with the uppermost of the overlapping portions of said sections and connecting said toe-calk to said sections, said pin also constituting a pivotal connection for said sections, bolts detachably connecting said member to both of said sections, and detachable heel-calks carried by said sections.

In testimony whereof, I affix my signature in presence of two subscribing witnesses.

LORENTZ LEHOTZKÝ.

Witnesses:
H. E. DUNLAP,
L. D. MORRIS.